United States Patent [19]

Seiger

[11] Patent Number: 5,795,056
[45] Date of Patent: Aug. 18, 1998

[54] ARRANGEMENT OF A LAMP IN AN OPENING OF A REFLECTOR OF A MOTOR VEHICLE HEADLIGHT

[75] Inventor: Ralf Seiger, Lippstadt, Germany

[73] Assignee: Hella KG Hueck & Co., Lippstadt, Germany

[21] Appl. No.: 649,666

[22] PCT Filed: Sep. 21, 1995

[86] PCT No.: PCT/EP95/03713

§ 371 Date: May 28, 1996

§ 102(e) Date: May 28, 1996

[87] PCT Pub. No.: WO96/12138

PCT Pub. Date: Apr. 25, 1996

[30] Foreign Application Priority Data

Oct. 12, 1994 [DE] Germany ............ 44 36 409.1

[51] Int. Cl.⁶ .............. B60Q 1/00; F21K 27/00; H01R 33/00

[52] U.S. Cl. .............. 362/263; 362/61; 362/80; 362/226

[58] Field of Search .............. 362/61, 263, 296, 362/80, 226, 396, 440, 444, 457, 418, 347

[56] References Cited

U.S. PATENT DOCUMENTS

| | | | |
|---|---|---|---|
| 3,593,017 | 7/1971 | Cibie | 362/61 |
| 4,156,901 | 5/1979 | Haraden et al. | 362/296 |
| 4,635,174 | 1/1987 | Montet | 362/61 |
| 4,670,822 | 6/1987 | Baker | 362/226 |
| 4,682,274 | 7/1987 | Freudenreich et al. | 362/61 |
| 4,760,506 | 7/1988 | Mochizuki et al. | 362/226 |
| 4,851,976 | 7/1989 | McMahan et al. | 362/226 |
| 4,868,722 | 9/1989 | Haraden | 362/80 |
| 4,872,096 | 10/1989 | Montet | 362/226 |
| 4,890,202 | 12/1989 | Blanche | 362/457 |
| 4,922,388 | 5/1990 | Freudenreich | 362/61 |
| 4,933,819 | 6/1990 | Mohsakowski et al. | 362/226 |
| 5,072,348 | 12/1991 | Tsukada | 362/226 |
| 5,186,535 | 2/1993 | Yokoyama | 362/80 |
| 5,361,191 | 11/1994 | Matsuzaki et al. | 362/61 |
| 5,607,218 | 3/1997 | Choji | 362/61 |
| 5,611,612 | 3/1997 | Choji et al. | 362/61 |
| 5,639,154 | 6/1997 | Kusagaya et al. | 362/61 |

FOREIGN PATENT DOCUMENTS

| | | | |
|---|---|---|---|
| 0145556 | 6/1985 | European Pat. Off. | 362/457 |
| 147934 | 7/1985 | European Pat. Off. | 362/347 |
| 21 22 103 | 11/1972 | Germany . | |
| 2122103 | 11/1972 | Germany . | |
| 23 12 633 | 9/1973 | Germany . | |
| 28 52 833 | 6/1979 | Germany . | |
| 295920 | 3/1980 | Germany | 362/457 |
| 28 53 227 | 6/1980 | Germany . | |
| 4012282 | 11/1990 | Germany . | |

*Primary Examiner*—Ira S. Lazarus
*Assistant Examiner*—Matthew J. Spark
*Attorney, Agent, or Firm*—Griffin, Butler, Whisenhunt & Szipl

[57] ABSTRACT

A lamp can be mounted in an opening of a reflector of a vehicle headlight from the rear side of the reflector. The lamp has a socket which lies against a support surface of the reflector and is covered by a cover mounted on the reflector. The lamp is held in position on the reflector by a spring holding element. The spring holding element has, laterally to the opening of the reflector, a reflector attaching first portion, a cover bracing free-standing second portion and a lamp socket gripping third portion which presses the lamp socket against the support surface.

12 Claims, 2 Drawing Sheets

ARRANGEMENT OF A LAMP IN AN OPENING OF A REFLECTOR OF A MOTOR VEHICLE HEADLIGHT

BACKGROUND OF THE INVENTION

This invention concerns an assembly for holding a lamp in an opening of a reflector of a motor vehicle headlight in which the lamp is mountable in the opening from a rear side of the reflector with a socket of the lamp engaging a supporting surface of the reflector, a cover for closing the opening is releasably attached to the rear side reflector at its rear side, and at least one spring holding element is tensioned against the cover and the lamp socket for pressing the socket against the supporting surface of the reflector when the lamp is mounted.

Such an assembly for arranging a lamp in an opening of a reflector of a motor vehicle headlight is disclosed in German patent publication DE 28 52 833. An opening of the reflector for receiving the lamp is surrounded by a collar formed on a rear side of the reflector. A surrounding shoulder is formed on an interior surface of the collar which has a support surface for a socket plate facing opposite a direction from which the lamp is mounted. A cover is a ring-shaped cap which is mounted on the collar of the reflector in a screwing manner. A spring holding element, which is a coiled spring, surrounds a cylindrical socket of the lamp between the socket plate and the cover. The coil spring engages an interior surface of the cap and presses the socket plate of the lamp against the support surface of the reflector. Thus, when the lamp is changed, only the cap must be released, and not the spring holding element as well, from attachment with the reflector. Mounting the cap is quite inconvenient and time consuming if the coiled spring is not affixed to the cap. The coiled spring can get bent or even become lost if the cap and the coiled spring are inadvertently, upon changing the lamps, laid to the side and/or the mounting of the cap and the coiled spring are not carried out in a correct manner. When the cap is mounted on the collar of the reflector at a diagonal to a lamp axis, the lamp can be forced from its desired position to an unfocused position relative to the reflector. One tries to prevent this latter from happening by placing shoulders on the cover and/or the reflector, but this defocusing of the lamp cannot always be assured. A coiled spring can only be used as the spring element if the lamp has a sufficiently large socket plate.

A spring holding element is disclosed in German patent publication DE 23 12 633 which has a ring-shaped portion which is placed in a collar and two spring tongues, whose free ends are directed in a direction opposite to a direction in which a lamp will be mounted, are positioned on opposite sides of the ring-shaped portion. Holding shoulders are formed on the ring-shaped portion having claws which are pressed into an inner side of the collar. The ring-shaped portion of the spring holding element has a support surface for the lamp facing a direction opposite to a direction in which the lamp will be mounted. The spring tongues have radial portions which are bowed inwardly to self-guidingly snap, behind, the socket. Thus, a mounting and dismounting of the lamp can be quickly carried out in an uncomplicated manner. However, a position of the lamp relative to the reflector is dependent upon the position of the spring holding element. Further, the lamp is not securely supported by the reflector because the connection between the spring holding element and the reflector can be loosened by vibrations or by driving operations.

In german patent publication DE 28 53 227, a tongue serving as a spring holding element is manufactured of sheet metal strip and has one portion attached to a collar surrounding an opening of a reflector and another portion snapingly gripping behind a lamp mounted in an opening of the reflector, with the socket being pressed against a support surface of the reflector facing the direction opposite to a direction in which the lamp is mounted as well as against a support surface facing radially to a lamp axis. In this case, fixed seating of the lamp depends upon a fixed seating of the spring tongue on the collar of the reflector. Further, when a lamp is mounted in the opening of the reflector, it can be diverted so far to the side by the spring force of the spring tongue that its glass tube can come in contact with a beam shield and be thereby damaged, in the interior of the reflector, if a beam shield is used.

An arrangement of a lamp in an opening of a reflector of a motor vehicle headlight is taught in German patent publication DE 40 12 282 A1 in which a gas discharge lamp is sealingly mounted in an opening of a reflector surrounded by a collar. A cover for covering the opening and the lamp supports an electrical apparatus which is coupled to the gas discharge lamp, including an ignition device to start the gas discharge lamp and an electrical series-connected device to drive the gas discharge lamp. The ignition device and the electrical-series connected device can also be contained in separate housings, with only one of them being on the cover. An electrical plug connection is placed between the cover including the electrical device, and the gas discharge lamp. German patent publication DE 40 12 282 does not disclose a holding element which maintains a lamp vibration free in a desired position during operation.

It is an object of this invention to provide an arrangement of a lamp in an opening of a reflector of a motor vehicle headlight, as set forth in the opening paragraph above, in which a spring holding element cannot be bent or even lost by improper mounting and dismounting of a cover, nor by an inadvertent laying to the side of the cover, so that the lamp always achieves a desired position and is held vibration free against the reflector when the cover is mounted.

This object is achieved according to principles of this invention, by having a first portion of a spring element, positioned beside the opening, attached to the reflector, a free standing second portion of the spring holding element engaging a cover, and a third portion of the spring holding element, which grips behind a lamp socket, pressing the socket against a supporting surface of the reflector. Once a lamp has been placed in an opening of a reflector, it is not only properly aligned to the reflector but also to the spring element attached to the reflector. Thus, as the cover is mounted, the lamp cannot move out of this desired position and it is held firmly on the reflector after the cover has been mounted, that is, after the spring holding element is braced against the cover. Because a spring force of the holding element necessary for affixing the lamp arises only after the cover has been mounted, once the cover has been taken off lamps can be easily removed from and returned to the reflector opening. This last feature is particularly useful if a glass cylinder of the lamp is sensitive to contact and is tightly surrounded by a beam shield in the interior of the reflector.

SUMMARY OF THE INVENTION

An easily accessible mounting and dismounting of the lamp is possible if at least one of the interengaging surfaces of the cover and the spring holding element is a supporting surface inclined to the mounting direction of the lamp, so that the spring holding element, after the cover has been mounted, is pressed radially to the lamp axis as well as toward the reflector. Upon dismounting of the cover, the spring holding element can spring radially outwardly, relative to the lamp axis, so that the lamp, upon its insertion into the opening of the reflector does not come in contact with the spring holding element.

Interconnection between the cover and the reflector can be made in many ways if the spring holding element braces itself on a support surface of a cover that has a ring shape and a central axis coinciding with the lamp axis. The interconnection can be a screwed-in connection between the cover and the reflector because then the spring holding element can slide along the circular shaped support surface. Because of the circular shaped support surface, the cover can also be coupled to the reflector at a plurality of different angular positions. This is useful if the cover has an asymmetrical shape, such as a cover which supports a series circuit for a gas discharge lamp. The electrical circuit can have integrated therein either only an ignition device for starting the lamp or an ignition device and a series circuit for operating the lamp.

In a particularly uncomplicated and cost effectively-manufactured embodiment of the spring holding element, it has second and third portions which are formed from a spring tongue which is bent toward the cover and the socket of the lamp. The spring tongue functions correctly if it is made to have a V-shape whereby the second portion is formed from the apex of the V-shape and the third portion is formed of an end portion of a free leg of the V-shape which extends toward the socket.

Further, it is beneficial that the free end portion of the spring tongue is bent outwardly, radial to the lamp axis, to lie under tension against an outer edge of the socket of the lamp pressing the socket of the lamp axially against a first support surface of the reflector, and radial to the lamp axis against a second support surface of the reflector. In such an embodiment, the socket must not have an unduly wide radial dimension relative to the lamp axis for the holding spring.

A particularly easy-to-mount form of the spring holding element is achieved if its first portion has a ring shape, surrounds the opening of the reflector, and is formed as one piece with the spring tongue from spring plate. The coupling between the ring-shaped first portion of the spring holding element and the reflector can be designed to be self snapping or clamping. In this regard the ring-shaped first portion should have a sufficiently large interior dimension that the support surface of the reflector facing opposite the mounting direction lies inside the ring-shaped first portion.

The lamp is particularly securely pressed against the support surfaces of the reflector facing opposite the mounting direction of the lamp and facing radially to the lamp axis, if spring forces are applied to the socket of the lamp by respective spring tongues on opposite sides of the opening of the reflector so that, when seen in the mounting direction of the lamp, two spring forces are applied in directions to form an obtuse angle between them which opens away from the support surface facing radially to the lamp axis.

A radial secure seating of the lamp on the reflector is particularly assured if, between the two spring tongues, a holding spring is arranged which presses the socket of the lamp against the support surface facing radially to the lamp axis and which is formed as one piece with the ring-shaped first portion. Because the holding spring only applies a radial force to the socket plate, it cannot lift the socket plate from the support surface facing opposite the mounting direction of the lamp on the side opposite the holding spring. This is possible if the socket contacts the support surface at three places and the places are spaced from the holding spring.

In a particular beneficial further embodiment of the invention, there is an electrical plug connection between the lamp and the cover and the third portion of the spring holding element grips behind the socket of the lamp in a self snapping manner. In this manner the lamp is held on the reflector so that it cannot be lost even before the cover is mounted on the reflector. This is useful if the lamp is a gas discharge lamp and the cover supports a gas discharge lamp electrical series circuit. In this manner, the lamp cannot be pulled out the opening of the reflector when the cover and the electrical circuit are removed from the reflector so that a breaking of electrical contacts between the electrical circuit and the gas discharge lamp is assured when the cover is removed. Further, when the cover and the electrical circuit are removed, the glass cylinder of the gas discharge lamp cannot break and fall into the interior of the headlight. Further, the gas discharge lamp can be easily inserted in the opening of the reflector and its desired position can be inspected before the cover is mounted.

BRIEF DESCRIPTION OF THE DRAWING

Two embodiments of the invention are represented in the drawings, in which.

DESCRIPTION OF THE PREFERRED EMBODIMENTS

Figure 2:
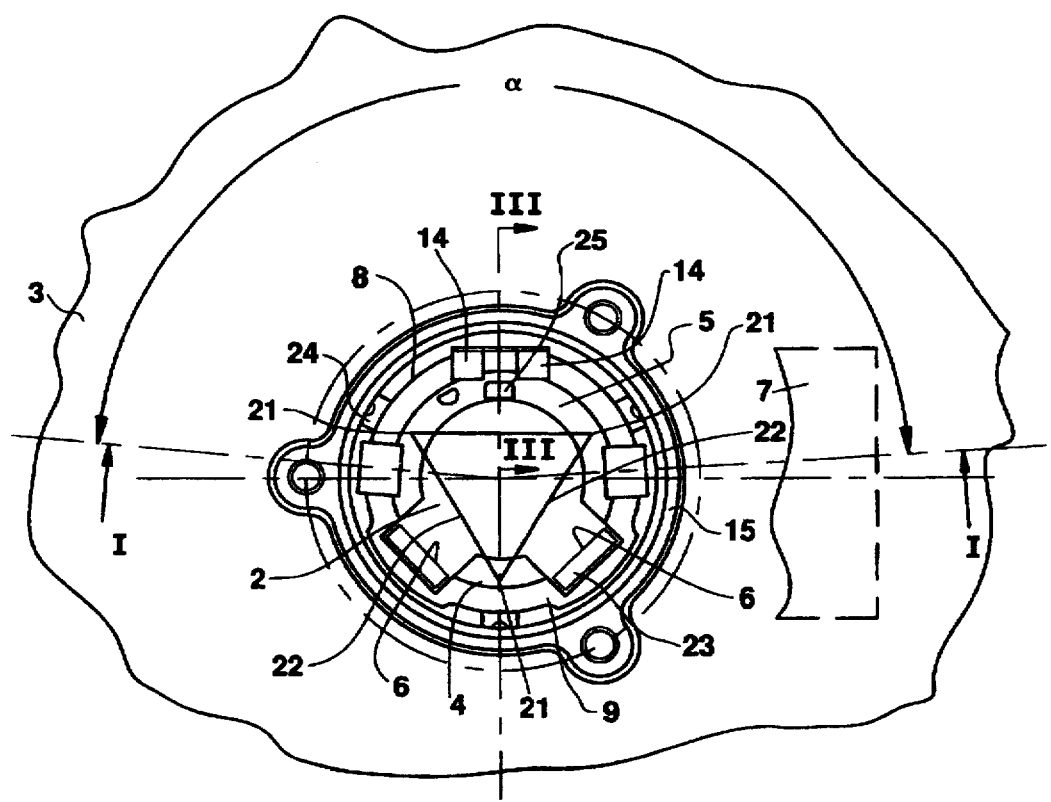
FIG. 2 is a view taken from direction II in FIG. 1 looking at the opening of the reflector and a spring holding element surrounding the opening, without the lamp and a cover for closing the opening.

A bowl shaped reflector 3 of a motor vehicle headlight is formed of resinous plastic and has a circular opening 2 at an apex thereof for receiving a lamp 1. The lamp 1 is a gas discharge lamp and has a finger-shaped glass cylinder 19 and a cylindrically-shaped socket 4 of resinous plastic with a contact member 18 thereon. The glass cylinder 19 of the lamp 1 is inserted through the opening 2 from the rear side of the reflector 3 until a surrounding outer flange 20 of the socket 4 lies against a support surface 5 of the reflector 3 which surrounds the opening 2. The support surface 5 faces opposite to a mounting direction of the lamp 1. Three bosses 21 of the socket, which form the three corners of an isosceles triangle 22, lie against the support surface 5 of the reflector (the triangle 22 only being shown in FIG. 2). The finger-like glass cylinder 19 of the lamp is closely surrounded by a light baffle, which is not shown in the drawing. An edge surface of the flange 20 of the lamp 1, lies against a support surface 6, directed in a radial direction relative to a lamp axis, which is formed by two shoulders 23 on the reflector 3. One boss 21 is arranged centrally between the two shoulders 23 and lies along one of the bisecting lines of symmetry of the triangle 22 and intersects with the lamp axis.

A spring holding element 8 presses the socket 4 against the support surface 5, which faces opposite the mounting direction of the lamp 1, as well as against the support faces 6, which face radially to the lamp axis. The spring holding element is constructed of spring plate and has two spring tongues with a second and a third portion 10 and 11 and a holding spring 14. A ring-shaped first portion 9 of the holding element 8 surrounds the opening 2 of the reflector 3 but is spaced therefrom and has fasteners 24 on an outer rim thereof whose tips are pressed into an interior surface of a surrounding collar 15 of the reflector 3 surrounding the opening. On the side of the opening 2, opposite the shoulders 23, the holding spring 14 is formed on the outer rim of the ring-shaped first portion 9 to have a flag-like shape and is bent into a V-shape about a bend line running perpendicular to its length axis. A bisecting line of the V of the holding spring 14 extends approximately parallel to the mounting direction of the lamp 1. An end of a free leg of the holding spring 14 lies, under tension, against a peripheral surface of the flange 20 of the socket 4 of the lamp 1 and urges the flange 20 against the support surface 6 of both shoulders 23. The flag-like holding spring 14 has a central slit with which the holding spring 14 extends about a positioning lug 25 on the reflector 3. The positioning lug 25 engages in a recess of the flange 20 of the socket for the lamp 1. The spring tongues of the holding element 8, which have the second and third portions 10 and 11, also lie symmetrical to the bisecting line of symmetry of the triangle 22 passing between the two support surfaces 6 and through the positioning lug 25. The two spring tongues are therefore arranged on opposite sides of the opening of the reflector 3. They are respectively formed there on the outer edge of the ring-shaped portion 9. The two spring tongues are bent about a bending line extending perpendicular to their lengths whereby a bisecting line of the V-shape extends substantially in the mounting direction of the lamp 1 and one leg is formed on the outer edge of the first portion 9; while a free leg, with a radially, outwardly bent, free portion, which is the third portion 11, lies under tension against an outer rim of the flange 20. The two spring tongues press the flange 20 of the socket 4 against the two support surfaces 5 and 6. This pressure of the socket 4 against the two support surfaces 5 and 6 arises because the two spring forces of the spring tongues applied to the spring socket, when seen from the mounting direction of the lamp, are at an obtuse angle a to one another whose apex point lies on the lamp axis. The angle bisector of the obtuse angle coincides with the bisecting line of symmetry of the triangle 22 and extends through the positioning lug 25. After the lamp is mounted in the opening of the reflector 3, the third portions 11 of the spring tongues automatically snap behind the flange 20 of the socket 4 and press it against the support surface 5 as well as against the support surfaces 6. The holding spring 14 presses the socket 4 only against the two support surfaces 6 which face radially to the lamp axis. Once the lamp 1 is mounted in the opening 2 of the reflector 3 it can be inspected to determine if the lamp has achieved its desired position in the reflector 3.

A resinous plastic cover 7 is placed on the collar 15 of the reflector 3, with a surrounding collar 16 thereof being inserted into the collar 15 of the reflector 3. The exterior of the collar 16 of the cover 7 has a surrounding ring groove in which a ring seal 26 is seated to lie, under tension, against the interior surface of the collar 15 of the reflector 3. The cover 7 is attached to the reflector 3 by means of three screws 27 which engage with threaded bores of the collar 15 of the reflector 3. The interior surface of the collar 16 of the cover 7 conically tapers inwardly in a direction opposite to the mounting direction of the lamp 1 and serves as a support surface 12 for the two spring tongues of the holding element 8, against which the two portions 10 of the spring tongues brace. The portion 10 lies in an area of the apex of the V-shaped spring tongues. The area of the V-shape extends in a bow and serves, together with the leg of the V-shape formed on the ring shaped portion, as a support surface 13 which lies on the support surface 12 of the cover 7.

Upon mounting the cover 7 on the collar 15 of the reflector 3 the support surface 13 of the spring holding element 8 lies along the support surface 12 of the cover and the radially outwardly sprung tongues are pressed inwardly until they press against the flange 20 of the socket of the lamp 1 with a sufficiently great spring force. The cover 7 supports on its exterior an electrical apparatus 17, whose housing is manufactured as one piece with the cover 7 of a resinous plastic. The electrical apparatus 17 includes an ignition device for starting the lamp 1, which is a gas discharge lamp, and an electrical series circuit for operating the gas discharge lamp. The socket for the lamp 1 extends through an opening of the cover 7 into the electrical apparatus 17 and is coupled therewith by an electrical plug connection. After reception of the cover 7 and the apparatus 17 by the reflector 3, the lamp 1 remains in the opening 2 of the reflector 3 because the lamp 1 is held by the spring holding element 8. The spring force which the spring holding element 8 applies to the flange 20 of the socket 4 is, however, not so great and thus the lamp 1 can be relatively easily removed from the opening 2 of the reflector 3. Further, because the lamp 1 remains in the opening 2 of the reflector 3, an electrical current flow between the electrical apparatus 17 and the lamp 1 is broken so that a person changing the lamp 1 is protected from a danger of being shocked.

Figure 1:
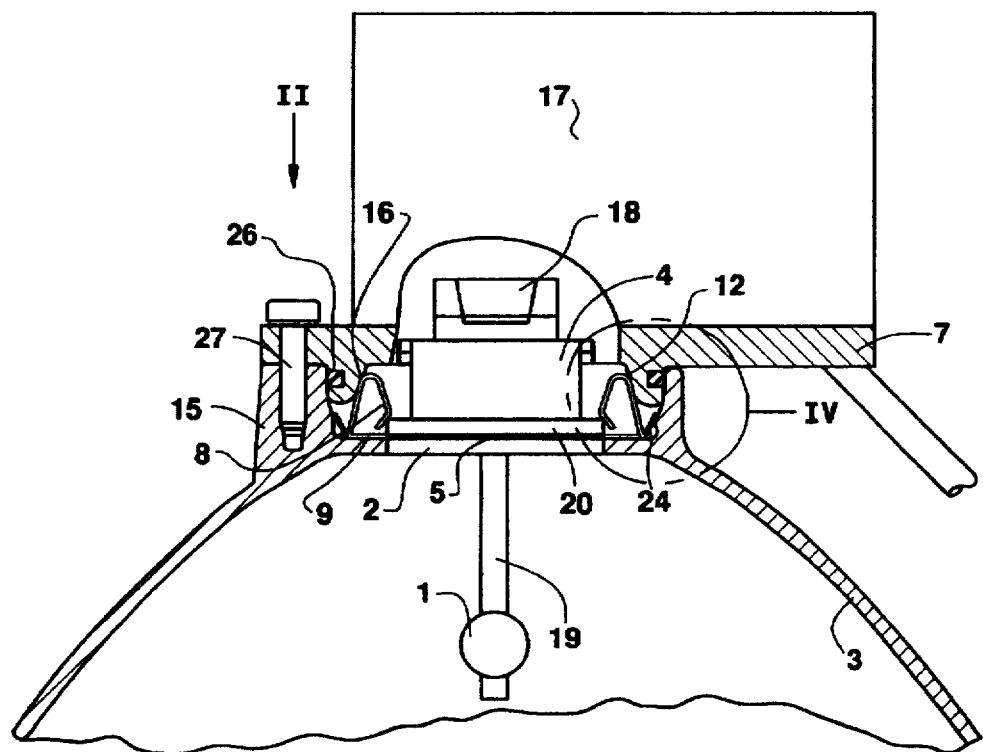
FIG. 1 is a horizontal lengthwise cross section taken on line I—I in FIG. 2, of an attaching apparatus for a lamp assembly in an opening of a reflector of a motor vehicle headlight.
Figure 5:
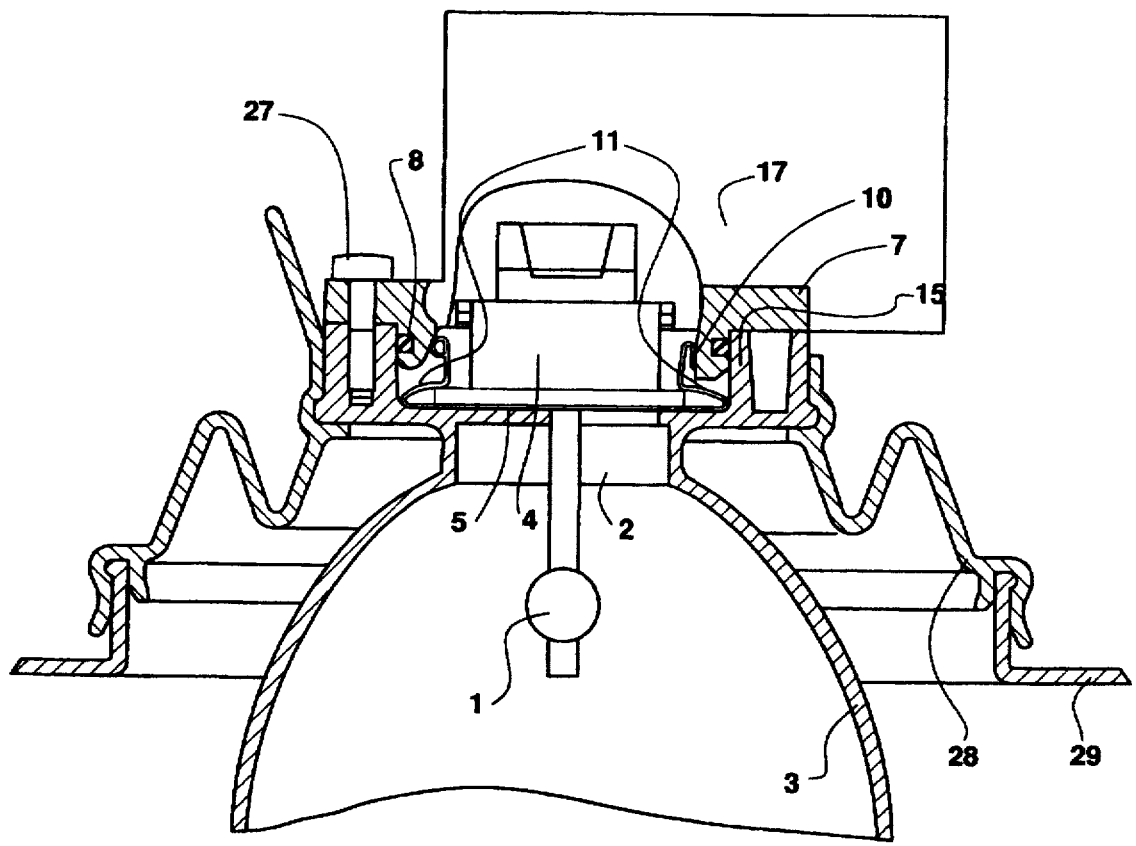
FIG. 5 is a horizontal length-wise cross sectional view of another-embodiment attaching apparatus for an attaching assembly for arranging a lamp in an opening of a reflector of a motor vehicle headlight.
Figure 3:
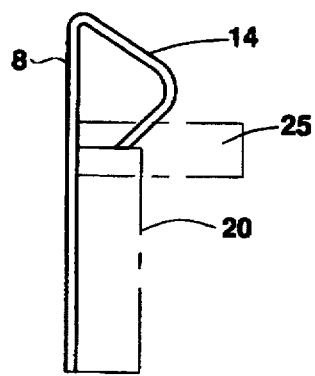
FIG. 3 is a cross sectional view taken on line III—III in FIG. 2 of the spring holding element.
Figure 4:
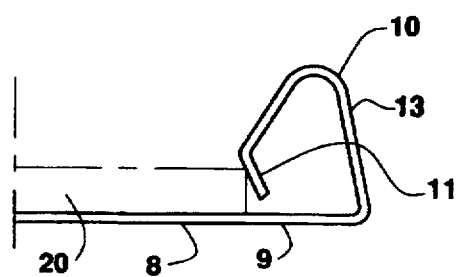
FIG. 4 is a segmented view of a portion IV of FIG.1 of the spring holding element of FIG. 1.

In the embodiment of FIG. 5, second and third portions 10 and 11 of the spring tongues of the holding element 8 have a substantially different structure. The second portion 10, which lies against the cover, is formed by a free end portion of the spring tongue and the third portion 11 is formed from a central portion of the tongue which bows outwardly from the flange 20 of the socket 4. A collar 15 has double walls with six threaded bores for screws 27 equally spaced about the collar 15 between the walls. Because in the FIGS. 1 and 2 embodiments, the cover 7 is coupled to the collar 15 at three places, the cover 7 can be attached at many angled positions to the reflector 3. A ring-shaped sealing cuff 28 lies on an exterior wall of the collar 15 for being sealingly placed against an opening edge of a housing 29 for receiving the reflector 3.

I claim:

1. Assembly for holding a lamp (1) in an opening (2) of a reflector (3) of a motor vehicle, in which: the lamp (1) is mountable in the opening in a mounting direction from a rear side of the reflector (3) with a socket (4) of the lamp (1) engaging a first supporting surface (5) of the reflector (3); a cover (7) for closing the opening (2) is releasably attached to the rear side of the reflector (3); and a spring holding element (8) is tensioned, when the lamp (1) is mounted, against the cover (7) and grips behind the socket (4) of the lamp (1) for pressing the socket (4) against the first supporting surface (5) of the reflector (3);

wherein a first portion (9) of the spring holding element (8) positioned beside the opening (2) is affixed to the reflector (3) even when the cover (7) is not attached to the reflector; a second portion (10) of the spring holding element engages the cover (7) when the cover (7) is attached to the reflector; and a third portion (11) of the spring holding element, which grips behind the socket (4) of the lamp (1), presses the socket (4) of the lamp (1) against the first supporting surface (5) of the reflector (3).

2. Assembly as in claim 1 wherein a surface of the cover (7) and a surface of the second portion of the spring holding element (8) which lie against one another when the cover is attached to the reflector, are inclined relative to the mounting direction of the lamp (1) so that the third portion, upon the cover (7) being mounted, is pressed radial to the mounting direction as well as toward the reflector (3).

3. Assembly as in claim 2 wherein the surface of the cover which lies against the surface of the second portion of the spring holding element is part of a contact surface (12) which is ring-shaped and which has an axis which coincides with a lamp axis.

4. Assembly as in claim 1, wherein the second and third portions (10 and 11) of the spring holding element (8) are formed as portions of a spring tongue which is bent toward the cover (7) and the socket (4) of the lamp (1).

5. Assembly as in claim 4 wherein the spring tongue has a V-shape, with the second portion (10) forming an apex portion of the V-shape and the third portion forming a free end portion of a free leg of the V-shape which extends toward the socket (4).

6. Assembly as in claim 5 wherein the free end portion (11) of the spring tongue is further bent outwardly radial to a lamp axis and lies under tension against an outer edge of the socket (4) of the lamp (1) for pressing the socket (4) of the lamp (1) in the mounting direction against the first supporting surface (5) and radially to the lamp axis against a second support surface (6).

7. Assembly as in claim 4 wherein the first portion (9) of the spring holding element (8) is formed in a ring shape, surrounding the opening (2) of the reflector (3) and being made of a single piece of spring plate together with the spring tongue.

8. Assembly as in claim 7, wherein the spring holding element (8) has at least two spring tongues which respectively apply spring forces against the socket (4) on opposite sides of the opening (2) of the reflector (3) whereby, when viewed in the mounting direction of the lamp (1), the two spring forces are applied in directions which form an obtuse angle ($\alpha$) relative to one another which opens in a direction away from the second supporting surface (6), which is directed radially toward lamp axis.

9. Assembly as in claim 8 wherein a further holding spring (14) being formed as one piece as part of the spring holding element is Positioned between the at least two spring tongues and presses the socket (4) of the lamp (1) against the second supporting surface (6).

10. Assembly as in claim 1 wherein there is an electrical plug connection (18) between the lamp (1) and the cover (7).

11. Assembly as in claim 1 wherein the third portion (11) of the spring holding element (8) snaps behind the socket (4) of the lamp (1) in a self-guiding snapping manner.

12. Assembly as in claim 1 wherein the lamp (1) is a gas discharge lamp and the cover (7) supports a gas discharge lamp series electrical device (17).

\* \* \* \* \*